United States Patent [19]

Huang

[11] Patent Number: 5,999,280
[45] Date of Patent: Dec. 7, 1999

[54] HOLOGRAPHIC ANTI-IMITATION METHOD AND DEVICE FOR PREVENTING UNAUTHORIZED REPRODUCTION

[75] Inventor: Pai-Ping Huang, Hsinchu Hsien, Taiwan

[73] Assignee: Industrial Technology Research Institute, Hsinchu, Taiwan

[21] Appl. No.: 09/106,551

[22] Filed: Jun. 30, 1998

[30] Foreign Application Priority Data

Jan. 16, 1998 [TW] Taiwan .................................. 87100543

[51] Int. Cl.⁶ ....................................................... G03H 1/00
[52] U.S. Cl. .................................. 359/2; 283/72; 283/86; 283/93
[58] Field of Search .................................. 359/2, 23, 463; 283/72, 85, 86, 93

[56] References Cited

U.S. PATENT DOCUMENTS

| 4,668,597 | 5/1987 | Merchant ................................... 430/22 |
| 5,712,731 | 1/1998 | Drinkwater et al. .................... 359/619 |

*Primary Examiner*—Cassandra Spyrou
*Assistant Examiner*—Darren E. Schuberg
*Attorney, Agent, or Firm*—Knobbe, Martens, Olson & Bear LLP

[57] ABSTRACT

A holographic anti-imitation method and device is provided, which can prevent a creative graphic design from unauthorized reproduction. The holographic anti-imitation method and device provides the creative graphic design as a hidden pattern in a synthesized image formed in a hologram that can be viewed only through a special viewing device. This allows the creative graphic design to be highly difficult to be reproduced by infringing parties. The synthesized image includes a background pattern visible to naked eyes and a hidden pattern merged into the background pattern which is invisible to the naked eyes. The hologram can be a dot-matrix hologram which is formed through laser means that generates two interfering laser beams to form a dot-matrix pattern of the synthesized image in the hologram. The hidden pattern can be viewed only through a special viewing device, such as a lenticular or a grate-like piece. When the viewing device is moved in crosswise or lengthwise direction over the hologram, the hidden pattern can be visualized to the viewer.

46 Claims, 4 Drawing Sheets

+

+

HOLOGRAPHIC ANTI-IMITATION METHOD AND DEVICE FOR PREVENTING UNAUTHORIZED REPRODUCTION

CROSS-REFERENCE TO RELATED APPLICATION

This application claims the priority benefit of Taiwan Application Serial No. 87100543, filed Jan. 16, 1998, the full disclosure of which is incorporated herein by reference.

BACKGROUND OF THE INVENTION

1. Field of the Invention

This invention relates to graphic means, and more particularly, to a holographic anti-imitation method and device which can prevent a creative graphic design, such as a trademark or a copyrighted graphic, from being easily reproduced by infringing parties. The holographic anti-imitation method and device provides a dot-matrix hologram in which the creative graphic design is encoded as a hidden pattern which can be viewed only through a special viewing device, such as a lenticular, so as to allow the creative graphic design to be highly difficult to be reproduced by infringers.

2. Description of Related Art

Commercial products are usually attached with labels printed with a creative graphic design, such as a trademark or a copyrighted graphic, when displayed for sale on the market so as to attract the attention of the buyers. By intellectual property law, the unauthorized reproduction and use of such a graphic design is illegal and infringes the rights of the titleholder. An infringer to such a graphic design can be sued by the title-holder for damages. However, in many cases, the unauthorized reproductions of the creative graphic designs by those infringers in the black market can be difficult to be found out and sued by the titleholder for damages. Especially because conventional product labels are usually made by print, the creative graphic designs thereon are very easy to be reproduced by the infringers. Although the holographic anti-counterfeit method has been widely used, it still can't prevent infringing completely. There exists, therefore, a need for an advanced method combining the holographic and a new kind of graphic means that can in some way show the creative graphic design to the viewer while nevertheless allowing the creative graphic design to be highly difficult to reproduce.

SUMMARY OF THE INVENTION

It is therefore an objective of the present invention to provide a holographic anti-imitation method and device which can prevent a creative graphic design from unauthorized reproduction by forming the creative graphic design as a hidden pattern in a hologram that can be viewed only through a special viewing device, thus allowing the creative graphic design to be highly difficult to be reproduced by infringing parties.

In accordance with the foregoing and other objectives of the present invention, a holographic anti-imitation method and device is provided for preventing a creative graphic design from unauthorized reproduction.

The holographic anti-imitation method and device of the invention provides a hologram which is formed with a synthesized image including a background pattern visible to the naked eyes of a viewer and a hidden pattern merged into the background pattern which is rendered invisible to the naked eyes of the viewer. The hologram can be a dot-matrix hologram which is formed by using laser means to generate two interfering laser beams to form those dots that together form the synthesized image in the hologram. The hidden pattern can be viewed only through a special viewing device, such as a lenticular or a grate-like piece. The viewing device is placed on the hologram. When the viewing device is moved by hand in crosswise or lengthwise direction over the hologram, the hidden pattern can be visualized to the viewer. The synthesized image can be made a dot-matrix hologram, which is formed by using laser means that is capable of generating at least two laser beams which are interfered in a predetermined manner to form dots with grating inside in a prescribed manner to form the synthesized image. The viewing device can be either a lenticular or a grate-like piece.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention provides a holographic anti-imitation method and device which can encode a creative graphic design, such as a trademark or a copyrighted graphic, as a hidden pattern in a hologram that can be visualized only through a special viewing device. This not only makes the creative graphic design highly difficult for infringing parties to reproduce, but also can provide an additional amusing and fascinating form of visual effect to the outer appearance of the hologram. The hologram can be made by using laser means or through a semiconductor lithographic and etching process. The synthesized image in the hologram can be displayed in various colors in addition to monochrome. The invention not only can improve the preventive capability of the creative graphic design against unauthorized reproduction, but also can provide value-added visual effect that may help attract attentions of the buyer. Details of the invention will be disclosed in the following with reference to FIGS. 1–5.

Figure 1A:
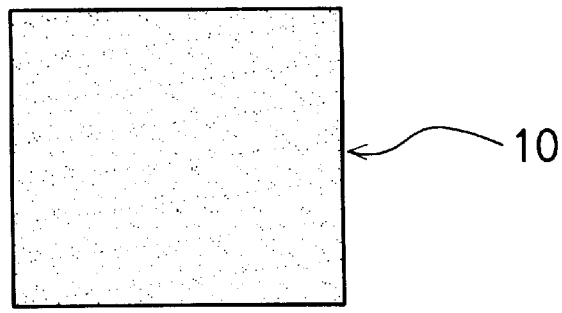
FIGS. 1a–1d are schematic diagrams used to depict the constituent parts and the use of the holographic anti-imitation device according to the invention.
Figure 1B:
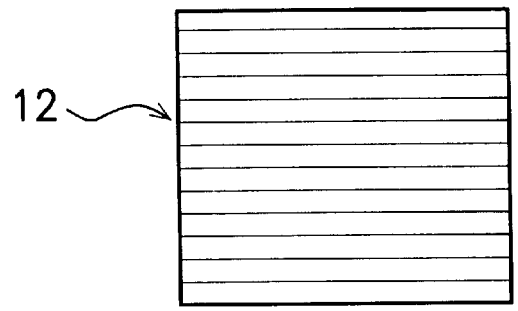
Figure 1C:
Figure 1C:
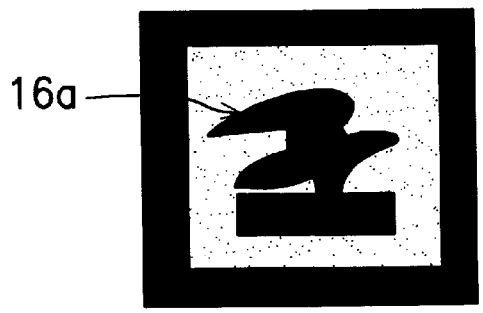
Figure 1D:
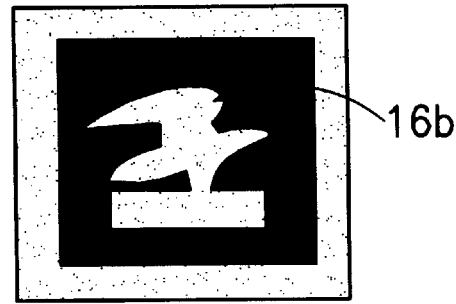

FIGS. 1a–1d are schematic diagrams used to depict the constituent parts and the use of the holographic anti-imitation device according to the invention. In FIGS. 1a–1d, the reference numeral 10 designates a hologram which shows an encoded synthesized image to the viewer, and the reference numeral 12 designates a viewing device 12 which can be a lenticular, or a grate-like piece, or the like. To the naked eyes of the viewer, the hologram 10 only displays a predesigned pattern of randomly spread dots seemingly unrelated to anything. However, when the viewing device 12 is placed upon and then moved in crosswise or lengthwise direction over the hologram 10, the hidden pattern, for example an eagle insignia as shown in FIG. 1, becomes visible; the visualized pattern appears as two kinds of types which are inverse to each other. They can be the one designated by the reference numeral 16a, as shown in FIG. 1c, or the one designated by the reference numeral 16b, as shown in FIG. 1d.

The utilization of the lenticular to show the stereo picture will be depicted in the following with reference to FIGS. 2a–2c and 3.

Figures 2A, 2B:
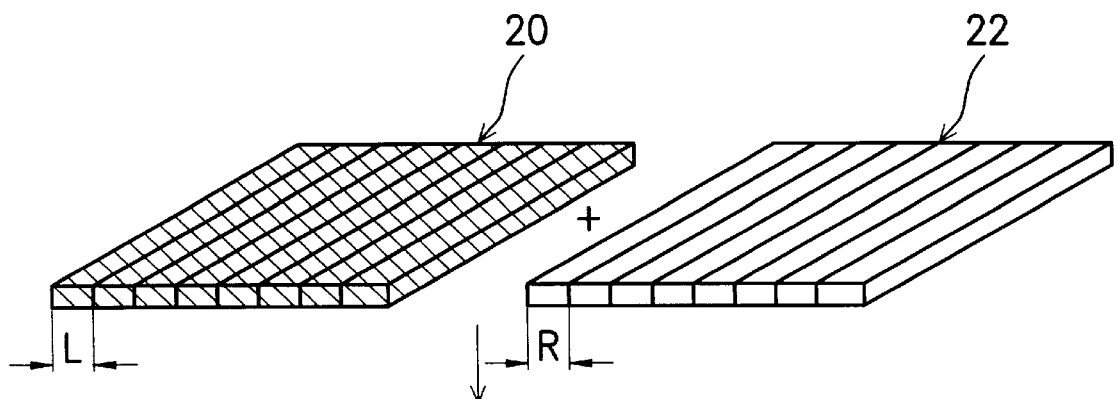
FIGS. 2a–2c are schematic perspective diagrams showing the structure of the interlaced graphics in a stereo picture.
Figure 2C:
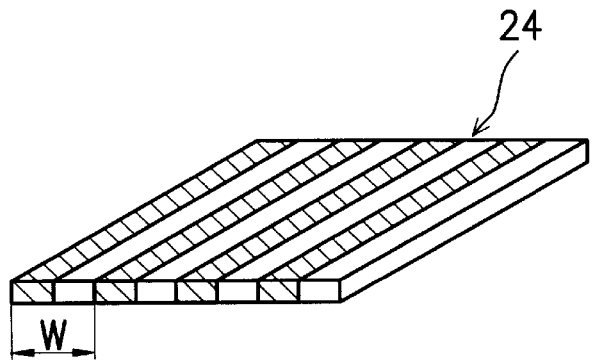
Figure 3:
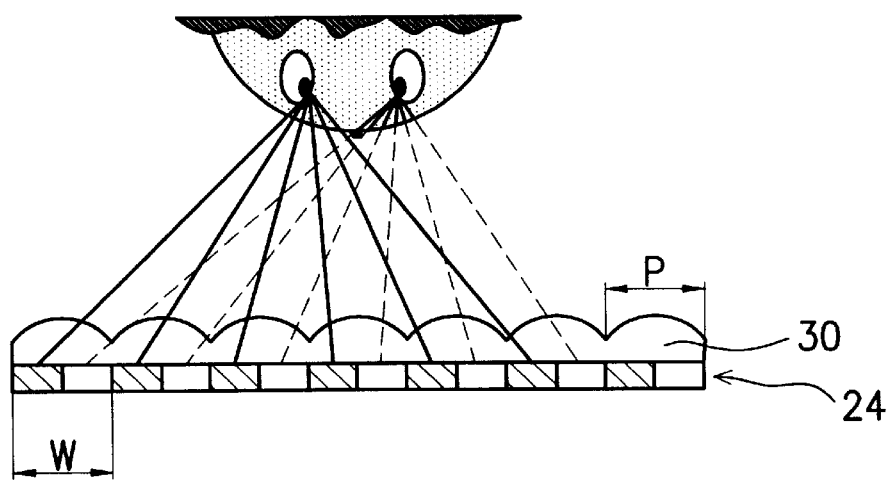
FIG. 3 is a schematic diagram used to depict how the interlaced graphics can be formed into a stereo picture through a lenticular.

In FIGS. 2a–2c, the reference numeral 20 designates the right-view part of the scene or an image which splits into parallel strips each having a width L; the reference numeral 22 designates the left-view part of the scene which is the same as the scene of the reference numeral 20 and splits into parallel strips each having a width R. A synthesized image 24 is formed by interleaving the strips from the right-view part 20 and those from the left-view part 22 into a plurality of paired strips, each pair having a width W, where W=L+R. It is strictly required that the width W should be precisely equal to the pitch P of the lenticular 30, as shown in FIG. 3. When the lenticular 30 is placed on the synthesized image 24, the refracted light from the left-view part of the synthesized image 24 will pass through the lenticular 30 to the left eye of the viewer, while the refracted light from the right-view part of the same will pass through the lenticular 30 to the right eye of the viewer. This causes the viewer to visualize the synthesized image 24 behind the lenticular 30 as a 3-D stereo image.

Figure 4A:
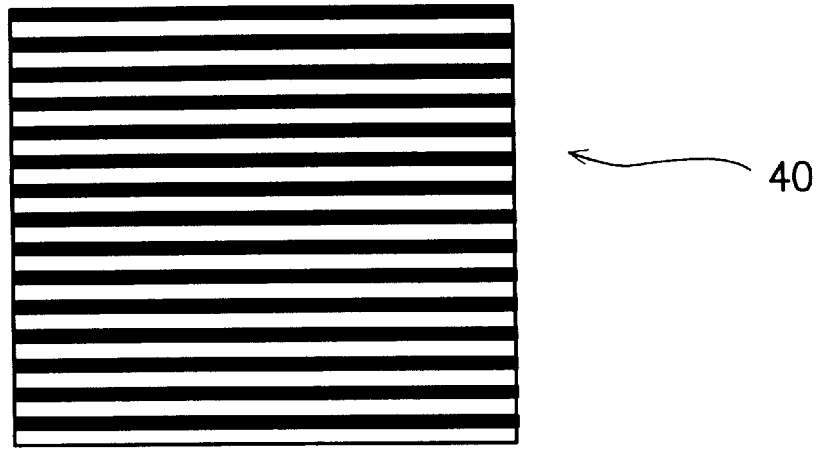
FIGS. 4a–4c are schematic diagrams used to depict the method to form a synthesized image of a background pattern and a hidden pattern.
Figure 4B:
Figure 4C:
Figure 4C:
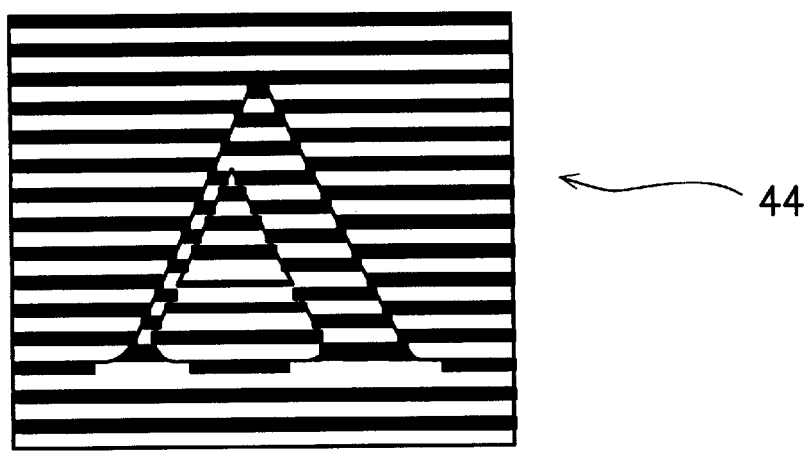

FIGS. 4a–4c are schematic diagrams used to depict the method to form a synthesized image in the hologram. To do this, two images are required: the first image is called a background pattern, which is, for example, a pattern of parallel and equally spaced black strips, as designated by the reference numeral 40 in FIG. 4a; and the second image is the creative graphic design that is intended to be hidden in the hologram (referred to as the hidden pattern hereinafter). For demonstrative purpose, assume the hidden pattern is the capital letter "A" as designated by the reference numeral 42 in FIG. 4b. The background pattern 40 is visible to the naked eyes of the viewer, while the hidden pattern 42 can be visualized only through a special viewing device such as the above-mentioned lenticular shown in FIG. 3. When viewing with such a lenticular, the parallel lenticular lenses thereof should be aligned in parallel with the straight strips in the background pattern 40. If misoriented out of parallelism, the undesired moire effect would appear in the visualization of the background pattern 40 through the lenticular. The more the lenticular is misoriented out of parallelism with respect to the straight strips in the background pattern 40, the more finespun will the moire effect become. If the lenticular is oriented precisely in parallel with the straight strips in the background pattern 40, the black strips in the background pattern 40 will be refracted altogether to one direction, and the white strips in the same will be refracted altogether to another direction. As a result, the viewer will visualize the background pattern 40 as an all-black or an all-white image depending on his/her viewing angles, and the color of the hidden pattern 42 should be inverse of the background pattern 40.

The background pattern 40 and the hidden pattern 42 are combined through an encoding process into a synthesized image as designated by the reference numeral 44 in FIG. 4c. The encoding process is performed in such a manner that those portions of the hidden pattern 42 that are laid over the black part of the background pattern 40 are inverted to white, while those portions that are laid over the white part of the background pattern 40 remain black. As a general rule, the overlapping portions of the hidden pattern 42 should be colored differently with respect to the underlying portions of the background pattern 40. This allows the synthesized image 44 to be roughly looked like the background pattern 40, with the hidden pattern 42 being rendered less prominent to the naked eyes. To view the hidden pattern 42, the viewer can place the above-mentioned lenticular upon the synthesized image 44 and then moves the lenticular in a direction perpendicular to the straight strips in the background pattern 40. This allows the hidden pattern 42 to be visualized alternately in all-black and then in all-white as the lenticular moves.

The viewing device can be instead a grate-like piece which is, for example, a transparent sheet formed with a plurality of parallel and substantially equal-spaced black (nontransparent) strips, each one strip having the same width as the black strips in the background pattern 40. Such a grate-like piece can also be used to visualize the hidden pattern 42 in the synthesized image 44 in the same way as the lenticular. The grate-like piece is more advantageous than the lenticular in that the pattern in the grate-like piece can be easily modified for various designs. However, the grate-like piece is much easier to manufacture than the lenticular, thus more likely to be reproduced by unauthorized infringers. The lenticular is less easier to manufacture. In practice, a number of lenticulars of various specifications can be used in combination so as to allow the holographic anti-imitation method and device of the invention to be more versatile in use.

When viewing the hologram with the naked eyes, the viewer will see the synthesized image 44, with the hidden pattern 42 (which shows a creative graphic design that is intended to be protected against unauthorized copy) to be substantially invisible. The hidden pattern 42 in the synthesized image 44 can be made even less noticeable to the naked eyes by adding some noisy patterns, for example randomly spread dots, in the synthesized image 44. The dots should be colored in such a manner that those that are laid over the white part of the synthesized image 44 are colored black, while those that are laid over the black part of the synthesized image 44 are colored white.

Therefore, in accordance with the invention, the synthesized image will be visualized in such a manner that the hidden pattern therein is substantially invisible to the naked eyes of the viewer, and the whole synthesized image will be disguised as a seemingly randomly drawn pattern which looks like the synthesized image of FIG. 1a. The hidden pattern 42 is substantially invisible to the naked eyes of viewer, and can be visualized only through the use of the above-mentioned lenticular or the grate-like piece.

In the foregoing synthesized image 44, only one single hidden pattern is formed. However, the number of hidden patterns in the synthesized image is not limited to just one, and can be two or more. In the case of forming two hidden patterns in the same synthesized image, the first hidden pattern is combined with the background pattern in such a manner that those portions that are laid over the black part of the background pattern are colored white, and those portions that are laid over the white part are colored white; and subsequently the second hidden pattern is combined with the background pattern in such a manner that those portions that are laid over the white part of the background pattern are colored black, and those portions that are laid over the black part are colored black. Moreover, the width of the strips in the background pattern should be reduced to ½ of the pitch of the lenticular. As a general rule, for the purpose of providing n hidden patterns in one single synthesized image, the width of the strips in the background pattern should be reduced to 1/n of the pitch of the lenticular. However, the larger the number n, the less will the resolution of the visualized image become.

Figures 5A, 5B:
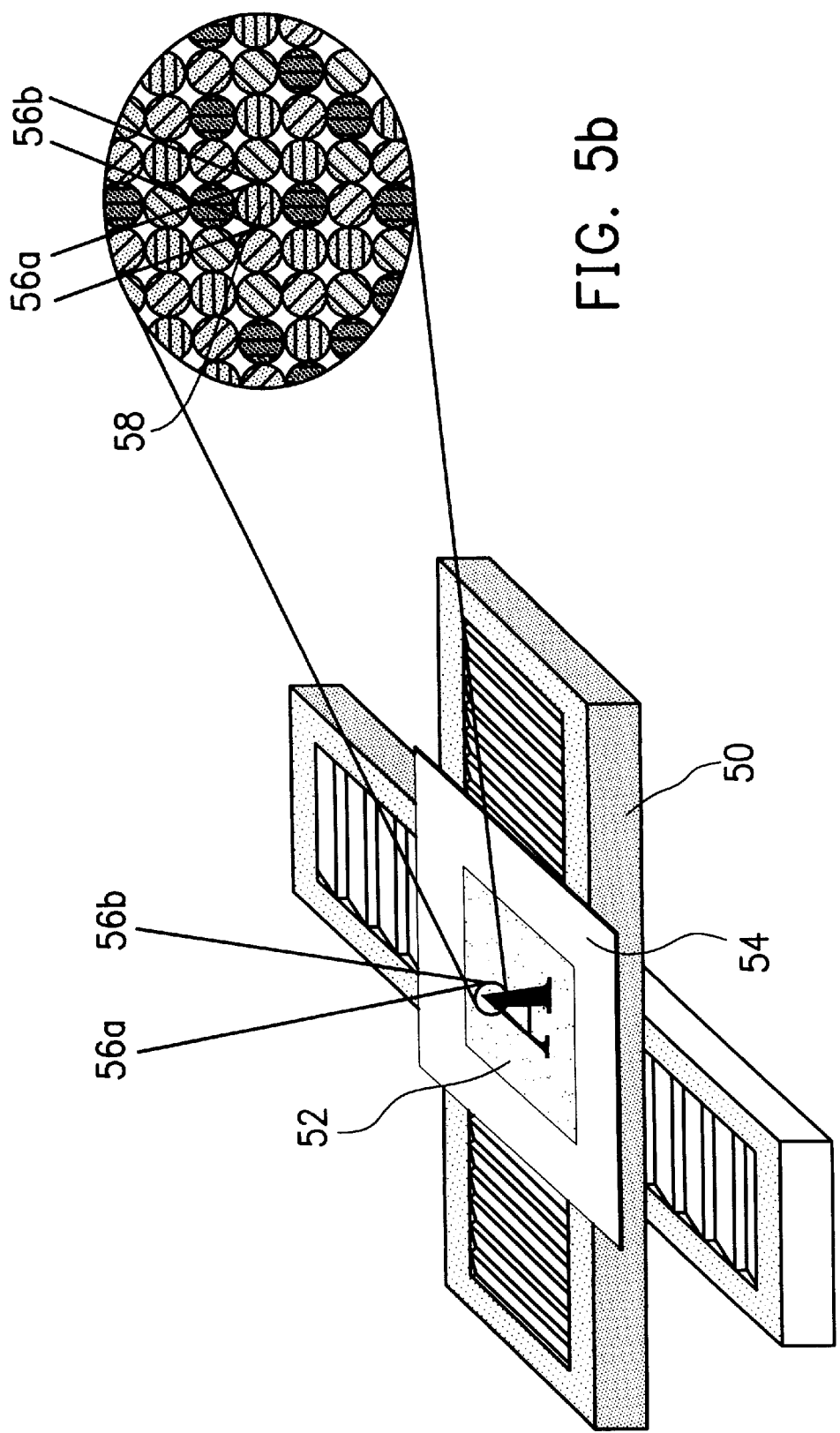
FIGS. 5a–5b are a schematic perspective diagrams used to depict the method to form a dot-matrix hologram through laser beams.

FIGS. 5a–5b are schematic perspective diagrams used to depict the method of transferring synthesized image into a hologram, such as a dot-matrix hologram, which is here designated by the reference numeral 52. The dot-matrix hologram 52 includes a prearranged matrix of tiny, circular dots 58, each dot being displayed as a certain color formed by the interference between two laser beams 56a, 56b on a photoresist plate 54. As shown in FIG. 5b which is an enlarged view of FIG. 5a, each dot 58 in the dot-matrix hologram 52 is composed of gratings, which are oriented in a certain direction to represent a different color. The colors in the dot-matrix hologram 52 are thus dependent on the orientations of the gratings of the dots. The orientations of the gratings of the dots can be varied by changing the incident angles of the laser beams 56a, 56b used to form the dot-matrix hologram 52. Moreover, the colors in the dot-matrix hologram 52 can be fetched from a predefined palette which contains a set of colors corresponding to the various orientations of the gratings.

If the synthesized image is monochrome, then the gratings thereof are all oriented in one single direction that makes the dots to be either fully bright or fully dark. If fully bright, the dot-matrix hologram 52 will display a particular color depending on the following factors: the light source being used, the viewing angle of the viewer's eyes with respect to the light source, and the diffraction of the illuminated image through the viewing device. In the case that the image in the dot-matrix hologram 52 is a color pattern and that the gratings of the dots are randomly oriented without any regularities, the visualized image will have a shining effect similar to that seen from the surface of a shined diamond. In the case that the directions of the gratings of the contiguous dots are changed with some regularities, the visualized image would have a watery, wavelike flowing effect. All of these techniques can be used to enhance the visual effect of the visualized image from the hologram. The hidden pattern in the hologram can be visualized simply by moving the above-mentioned lenticular or the grate-like piece over the hologram.

The dot-matrix hologram 52 can be formed by various methods. For example, it can be formed by first coating a photoresist layer over a plate made from, for example glass, semiconductor substrate, or plastics, then exposing the plate under interfering laser beams, and finally developing the exposed photoresist plate to form the synthesized image. If a semiconductor substrate is used, a lithographic and etching process is performed to first transfer the synthesized image drawn on a mask onto the photoresist plate and then etch away the unexposed portions of the photoresist plate. Once the dot-matrix hologram is formed, it can then be used for mass production after electro-forming process through such manufacture methods as injection molding, hot stamping, and embossing.

In conclusion, the holographic anti-imitation method and device of the invention has the following advantages. First, the dot-matrix hologram is highly complex in form, which allows it to be much more difficult to be copied by infringing parties as compared to the conventional printed matter. Second, the use of the lenticular in conjunction with the dot-matrix hologram allows the holographic anti-imitation device of the invention to be even more difficult to be reproduced by infringing parties. Third, the synthesized image, in addition to the benefit of disguising the creative graphic design, can provide an amusing and fascinating form of pattern that allows the hologram to be looked more fascinating that can better attract the attention of the buyers. Fourth, during the process for making the dot-matrix hologram 52, since the dots therein are formed one by one through laser means on the photoresist plate 54, they can be easily controllably formed by designating the orientations for the gratings of each of the dots to provide the desired color effect. This technique allows the holographic anti-imitation device to be even more difficult to be copied by infringing parties.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A holographic anti-imitation device, which comprises:
   a hologram;
   a synthesized image formed in said hologram, said synthesized image including
      a background pattern which is visible to the naked eyes of a viewer, and
      a hidden pattern merged into said background pattern, which is rendered
      invisible to the naked eyes of the viewer; and
   a viewing device placed on said hologram for the viewer to visualize said hidden pattern in said synthesized image to the naked eyes.

2. The holographic anti-imitation device of claim 1, wherein said hologram is a dot-matrix hologram.

3. The holographic anti-imitation device of claim 1, wherein said viewing device visualizes said hidden pattern by being manually moved in crosswise or lengthwise direction over said hologram.

4. The holographic anti-imitation device of claim 1, wherein prior to being transferred into a hologram, said background pattern is a monochrome black and white image including a plurality of parallel and alternately arranged black and white strips.

5. The holographic anti-imitation device of claim 4, wherein said hidden pattern in said synthesized image is a monochrome black and white image which is, when merging into said background pattern, transformed in color in such a manner that those portions of said hidden pattern that are overlaid over the black part of said background pattern are colored white and those portions of said hidden pattern that are overlaid over the white part of said background pattern are colored black.

6. The holographic anti-imitation device of claim 1, wherein said synthesized image further includes a multiplicity of randomly spread dots.

7. The holographic anti-imitation device of claim 1, wherein said synthesized image in the dot-matrix hologram appears as a colorful visual effect by arranging the orientation of gratings of each dot in the hologram.

8. The holographic anti-imitation device of claim 1, wherein the visualized image through said viewing device includes at least two pictures which appear in an alternate manner.

9. The holographic anti-imitation device of claim 8, wherein one of the at least two pictures is the inverted version of the other.

10. The holographic anti-imitation device of claim 8, wherein the at least two pictures are completelly different images.

11. The holographic anti-imitation device of claim 1, wherein said viewing device is a lenticular.

12. The holographic anti-imitation device of claim 1, wherein said viewing device is a grate-like piece which is formed with a plurality of parallel-spaced colored nontransparent strips thereon.

13. The holographic anti-imitation device of claim 12, wherein said viewing device is a grate-like piece which is formed with a plurality of parallel-spaced black nontransparent strips thereon.

14. The holographic anti-imitation device of claim 1, wherein said hologram includes:
 a glass sheet; and
 a photoresist layer coated over said glass sheet, said photoresist layer being exposed through laser means and developed to form said synthesized image.

15. The holographic anti-imitation device of claim 1, wherein said hologram includes:
 a semiconductor substrate; and
 a photoresist layer coated over said substrate, said photoresist layer being exposed through laser means and developed to form said synthesized image.

16. The holographic anti-imitation device of claim 1, wherein said hologram includes:
 a plastic sheet; and
 a photoresist layer coated over said plastic sheet, said photoresist layer being exposed through laser means and developed to form said synthesized image.

17. The holographic anti-imitation device of claim 1, wherein said hologram is produced through tinfoil embossing.

18. The holographic anti-imitation device of claim 1, wherein said hologram is produced through aluminum-sheet embossing.

19. The holographic anti-imitation device of claim 1, wherein said hologram is produced through acrylic-plastic mold injection.

20. The holographic anti-imitation device of claim 1, wherein said hologram is produced through acrylic-plastic hot stamping.

21. The holographic anti-imitation device of claim 1, wherein said hologram is produced through glass mold injection.

22. A holographic anti-imitation method used for identification purpose, comprising:
 preparing a photo-sensitive sheet;
 forming a synthesized image on said photo-sensitive sheet through holographic means to form a hologram, said synthesized image in said hologram including a background pattern visible to naked eyes and a hidden pattern merged into said background pattern which is rendered invisible to the naked eyes; and
 positioning a viewing device over said hologram for visualizing said hidden pattern to the naked eyes.

23. The holographic anti-imitation method of claim 22, wherein said hidden pattern is a monochrome said black and white image before transferring into a hologram which is, when merging into said background pattern, transformed in color in such a manner that those portions of said hidden pattern that are overlaid over the black part of said background pattern are colored white and those portions of said hidden pattern that are overlaid over the white part of said background pattern are colored black.

24. The holographic anti-imitation method of claim 23, wherein said background pattern further includes a multiplicity of randomly spread dots.

25. The holographic anti-imitation method of claim 22, wherein said hologram is a dot-matrix hologram.

26. The holographic anti-imitation method of claim 22, wherein said hologram is formed on a glass sheet coated with a photoresist layer, with said photoresist layer being exposed through laser means and then developed to form said synthesized image.

27. The holographic anti-imitation method of claim 22, wherein said holographic means includes laser means.

28. The holographic anti-imitation method of claim 27, wherein said laser means is capable of generating at least two laser beams which are interfered in a predetermined manner to form the dots in the dot-matrix hologram in a dot-by-dot manner, each dot being composed of gratings.

29. The holographic anti-imitation method of claim 28, wherein the dots have their gratings oriented in various directions so as to provide a colored appearance for the synthesized image in said hologram.

30. The holographic anti-imitation method of claim 22, wherein said hologram is formed on a plastic sheet coated with a photoresist layer, with said photoresist layer being exposed through laser means and then developed to form said synthesized image.

31. The holographic anti-imitation method of claim 22, wherein said hologram is formed on a semiconductor substrate coated with a photoresist layer, with said photoresist layer being exposed through laser means and then developed to form said synthesized image.

32. The holographic anti-imitation method of claim 31, wherein said synthesized image is formed by the steps of:
 forming said synthesized image in a mask;
 performing a lithographic process so as to transfer said synthesized image in said mask onto said photoresist layer coated over said substrate; and
 performing an etching process to remove the masked portions of said photoresist layer, with the remaining portions of said photoresist layer serving as said synthesized image.

33. The holographic anti-imitation method of claim 22, wherein said hologram is produced through tinfoil embossing.

34. The holographic anti-imitation method of claim 22, wherein said hologram is produced through aluminum-sheet embossing.

35. The holographic anti-imitation method of claim 22, wherein said hologram is produced through acrylic-plastic mold injection.

36. The holographic anti-imitation method of claim 20, wherein said hologram is produced through acrylic-plastic hot stamping.

37. The holographic anti-imitation method of claim 22, wherein said hologram is produced through glass mold injection.

38. The holographic anti-imitation method of claim 22, wherein said viewing device displays said hidden pattern by being moved in crosswise or lengthwise direction over said hologram.

39. The holographic anti-imitation method of claim 22, wherein, prior to being transferred into hologram, said background pattern is a monochrome black and white image including a plurality of parallel and alternately arranged black and white strips.

40. The holographic anti-imitation device of claim 22, wherein said synthesized image in the dot-matrix hologram appears as a colorful visual effect by arranging the orientation of gratings of each dot in the hologram.

41. The holographic anti-imitation method of claim 22, wherein the visualized image through said viewing device includes at least two pictures which appear in an alternate manner.

42. The holographic anti-imitation device of claim 41, wherein one of the at least two pictures is the inverted version of the other.

43. The holographic anti-imitation device of claim 41, wherein the at least two pictures are completely different images.

44. The holographic anti-imitation method of claim 22, wherein said viewing device is a lenticular.

45. The holographic anti-imitation method of claim 22, wherein said grate-like piece which is formed with a plurality of parallel-spaced colored nontransparent strips thereon.

46. The holographic anti-imitation method of claim 22, wherein said grate-like piece which is formed with a plurality of parallel-spaced black nontransparent strips thereon.

* * * * *